United States Patent Office 3,193,248
Patented July 6, 1965

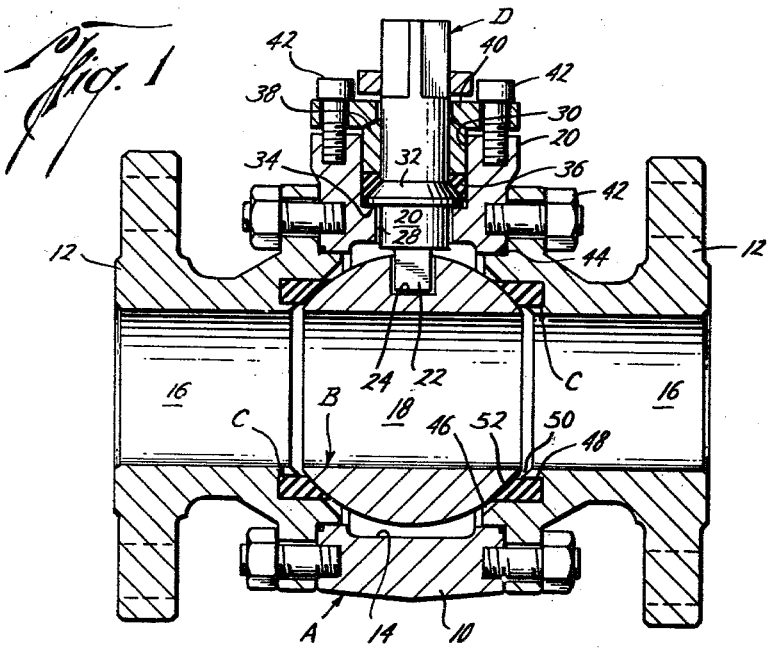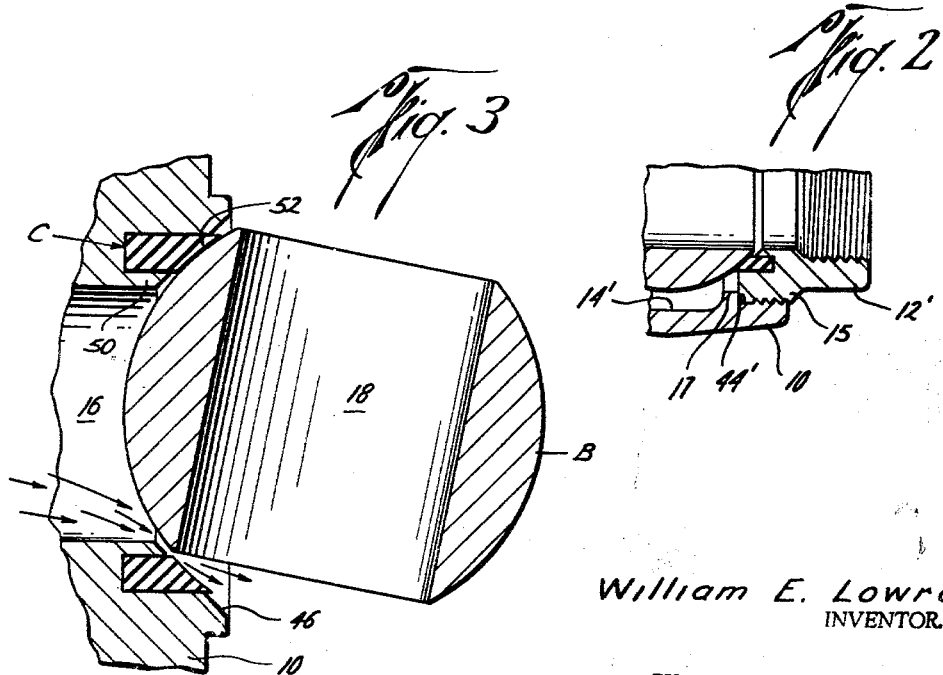

3,193,248
BALL VALVE SEAT CONSTRUCTION
William E. Lowrey, Houston, Tex., assignor to ACF Industries, Incorporated, New York, N.Y., a corporation of New Jersey
Filed Nov. 20, 1961, Ser. No. 153,481
4 Claims. (Cl. 251—315)

This invention relates to spherical plug valves or ball valves as they are more commonly known.

Basically, a ball valve is very simple. It is essentially comprised of a valve body, a rotatable ported valve member, and one or more seat members. The seat members are located between the valve member and portions of the valve body. One common type of construction utilizes annular detachable end members to complete the body assembly. The end members are insertable into a through bore in the body and then are detachably connected to the body. In such construction, the seat member is carried by the end member. The end member's entry into the body forces the seat members into intimate sealing contact with the spherical surface of the valve member. In effect, the seat members are placed under load which establishes the initial seal for the valve. As a rule in such construction the valve member is free floating and will float on the application of line pressure over to the downstream side, and by applying a load to the downstream seat will effect a seal at the downstream side of the valve. If a seat member is not confined, the amount of load which can be applied to it is limited to the internal strength of the material forming the seat. It is one of the objects of the present invention to provide a valve in which the seat members are essentially confined to allow a greater unit load.

The spherical surface of the valve member in ball valves never loses contact with the seat members; however, during rotation a portion of the seat members is out of contact with the spherical surface of the valve member as the port in the valve member passes over it. It is during this time that one of the most frequent difficulties with ball valves occurs, that is, the lading flow on the upstream side gets behind the unsupported portion of the upstream seat member and pushes it into the path of the oncoming port of the valve member which shears it off. It is an object of the present invention to provide a valve in which the tendency for the unsupported portion of the seat member to move into the path of the port in the valve member during operation of the valve is minimized.

Another difficulty encountered with ball valves is that although the seat material may have a very low coefficient of friction the breaking torque is quite high. One reason for this is that the breaking torque usually depends upon the amount of interference between the seat member and the valve. As a rule, ball valves are inexpensive and must be so designed that they can be made economically in a production-like manner. Accordingly, tolerances have to be provided which can be satisfactorily maintained in an ordinary manufacturing plant. However, even though individual tolerances may be small the stack-up of tolerances may result in a valve with seat contact which is too tight, and therefore, the interference between the seat and valve member will be greater than required and the breaking torque will also be higher than desired. Accordingly, it is another object of the present invention to so provide a valve in which predictable interference can be built in with a minimum turning torque requirement for any pressure rating.

In order to accomplish these objects and other objects which will be apparent from the detailed description which is about to follow, the valve of the present invention has numerous improvements over prior art valves. The valve body has a bore extending therethrough. A ported spherical valve member is positioned in the bore. In order to turn the valve, a stem is provided. The stem has an axial inner end which is in engagement with the spherical valve member, and an axial outer end which extends through an aperture in the valve body. Means are provided to form a seal between the stem and the aperture through which it extends. End members, each having a passage, extend into each end of the body bore. The axial inner end of each end member has a portion which taperingly diverges axially inward from the central passage in which is located an annular groove. The inner circumferential wall of the groove is spaced from the passage to provide a wall between the passage and groove. A seat member is located in the groove. The seat member has a portion extending beyond the surface of the taperingly diverging portion and terminates in a tapered surface opposing the spherical surface of the valve member. The inward movement of each end member is sufficient to force the seat member into intimate contact with the spherical surface of the valve member. Since the seat member, except for the surface opposing the valve member, is essentially confined a high unit load can be placed on the seat member without undue distortion. The upstream seat is protected from the velocity of the flow by the wall between the passage and the groove. Means are provided to disengageably connect the end members to the body and form a seal between the body and end member. As mentioned, the wall between the passage and the seat protects it from the velocity component of the upstream flow and the seat is of sufficient depth to get the velocity component diverted past the corner of the seat. Accordingly, the seat is never subject to the velocity component of the upstream flow and therefore the tendency for the unsupported portion of the seat to be forced into the path of the port in the valve member as it moves from the open to the closed position is minimized. By having the end member arrested by contact with a defined stop, the amount of interference between the seat and spherical valve member can be predicted and therefore the minimum turning torque requirement for any pressure rating can be built into the valve with a fair amount of certainty using normal manufacturing tolerances.

Other and further objects of the invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for purpose of illustration and description and are shown in the accompanying drawings, forming a part of the specification, wherein:

FIG. 1 is a cross-sectional view of a ball valve constructed in accordance with the teachings of the present invention.

FIG. 2 is a fragmentary cross-sectional view showing an alternate means of attaching the end members to the housing.

FIG. 3 is a fragmentary cross-sectional view showing the valve in an intermediate position.

Referring now to the drawings, it can be seen that the ball valve therein illustrated is comprised generally of a valve body A, a spherical valve member B, a pair of seat members C—C, and a stem D with which to rotate the valve member B.

The valve body A is formed of a central annular housing 10 and two annular end members 12—12 which are disengageably connected to the ends of the annular housing 10. The annular housing 10 has a bore 14 extending therethrough which forms a valve chamber in which is positioned the spherical valve member B. The two end members 12—12 are provided with passages 16—16 the axis of which are concentric with the axis of the bore 14 when end members 12—12 are attached to the housing 10. The spherical valve member B is provided with a port 18 which is alignable with the passages 16—16 in the open position of the valve to form the run of the valve. The axis of the port 18 is concentric with the axis of the bore 14 and the port 18 may be the same size as the passages 16—16 as is shown in the drawings, or may be smaller for a venturi design as is well known in the art. In order to rotate the spherical valve member B, the stem D is provided. The stem D has a cylindrical axial inner end 20 which terminates in a rectangular tongue 22 for engagement with a slot 24 in the spherical valve member D. The slot 24 runs transverse to the port 18 so that in the closed position of the valve the valve member will in effect be free floating. The housing 10 is provided with a boss 26 through which extends a counterbore formed of a small aperture 28 communicating with the bore 14 and a large aperture 30 extending from the aperture 28 to the outer end of the boss 26. The cylindrical inner end 20 of the stem D passes through the aperture 28 to permit the tongue 22 to engage with the slot 24 in the spherical valve member B.

To form a seal between the stem D and the large aperture 30, the stem D is provided with a shoulder 32 about which are located packing rings 34–36. A compression ring 38 is located axially outward of the packing ring 36 and is held in position by a packing plate 40 which is attached to the top of the boss 26 by packing adjusting screws 42. This assembly retains pressure on the packing rings 34–36.

The end members 12—12 may be detachably connected to the central housing 10 by means of threaded members 42 which pass through apertures located in a flange portion 43 of each end member 12. The flange portion 43 is of greater diametrical width than the inward end of the end member and limits the entry of the end member 12 to a predetermined amount. If desired, the annular housing 10′ may be lengthened and the axial outer end of the bore 14′ and inner end 15 of the end members 12′ provided with mating threads as shown in FIG. 2. In such case the bore 14′ is provided with a shoulder 17 which will arrest the inner end 15 of the end member 12′ similar to the arresting of the end member 12 by the flange portion 43 of the end member 12 contacting the end of the housing 10. Accordingly, the assembly of the body in either case will be such that the end member's entry into the central housing will be a predetermined amount. Such construction will assist in determining the interference between the spherical valve member B and seats C—C as will be more fully developed later. To seal the opening between the body and the end members a seal 44 or 44′ is provided.

The axial inner end of the end members 12 has a portion 46 which taperingly diverges from the passage 16. An annular groove 48 is located in the taperingly diverging portion 46. The axis of the groove 48 is concentric with the axis of the passage 16. The inner circumferential wall of the groove 48 is spaced from the passage 16 to provide a wall 50 between the passage 16 and the groove 48. Positioned in the groove 48 is the annular seat member C.

The seat C is formed of a material having the following qualifications: impervious to inner leakage; flexible enough to conform to the spherical surface of the valve member; resistant to fluids likely to be carried by the valve; sufficient internal strength to resist excessive distortion and to resist being blown out during operation; low coefficient of friction to permit easy operation; stable characteristics over a wide temperature range; a fair degree of resiliency; easy to handle and simple to use; and economically available. While these requirements may at first appear rigorous, it has been found that one of the fluorocarbon plastics, i.e., polytetrafluoroethylene sold by Du Pont under the trademark "Teflon," satisfactorily fulfills the above requirements and provides a usable material for the seat C. Depending upon the size, lading to be carried, and pressure rating, the seat C may be formed of other materials including other fluorocarbon plastics such as polychlorofluoroethylene sold under the trademark "Kel-F," nylon, other plastics, hard rubber, etc. In some instances, it may be desirable to use a seat formed of metallic or ceramic material such as graphite.

Each seat member C has a portion 52 extending beyond the surface of the taperingly diverging portion 46 which terminates in a tapered end surface opposing the spherical surface of the valve member B. The tapered surface may be either planar if made of soft material or spherically contoured if made of hard material. As previously mentioned, each end member 12 extends into the annular body 10 an amount sufficient to force the end surface of the portion 52 into intimate contact with the valve member B. Since the seat member C except for the portion 52 is essentially confined a relatively high unit load can be placed on the seat C without undue distortion. This is particularly important in relation to the downstream seat since as previously mentioned the valve member B is free floating and will float against the downstream seat causing the downstream seat to carry the total load developed by line pressure. The valve is so designed that the amount of interference between the seat C and valve member B can be carefully regulated so that the interference will not be so excessive as to cause an exceedingly high break-away torque. In order to accomplish this, the amount of entry of the end members into the central housing is predetermined and the desired interference can be developed by regulating the amount that the portion 52 extends beyond the tapered surface 46. With such construction the amount of interference between the seats C—C and valve member B can be predicted and the minimum turning torque for any pressure rating can be built into the valve.

One of the difficulties commonly encountered in ball valves is that the portion of the upstream seat C which is unsupported during operation of the valve is pushed out by the upstream line pressure into the path of the port which tends to shear it off. It has been found that this action is due to the velocity component of the flow getting behind the upstream seat. In the present valve, the seat C is of sufficient depth so that the wall 50 diverts the velocity component of the upstream flow past the corner of the seat C. Attention is directed to FIG. 3 where the valve member B is shown in a position intermediate open and closed showing the seat member C being unsupported due to the pressure of the port 18. The arrows show how the flow is diverted past the axial outer corner of the seat C so that there is no force tending to force the seat in the path of the port 18. Accordingly, the portion of the seat C which is unsupported, when the port 18 of the valve member B is opposite it, is never subject to the velocity component of the upstream flow and therefore tendency of the unsupported portion of the seat to move into the path of the port 18 during operation is minimized.

The wall 50 serves a further function in that if the seat C is ever disintegrated by high temperature the spherical valve member B will float over and contact the wall 50. Since the wall 50 is rather thin, it will act as a spring and the line pressure will tend to force it into intimate contact with the valve member making an effective metal-to-metal seal.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

What I claim is:

1. A rotatable spherical plug valve comprised of a valve body having a bore extending therethrough; a spherical valve member positioned in the bore, said spherical plug member having a port the axis of which is alignable with the axis of the bore in the open position of the valve; an aperture in the valve body; a stem having an inner end engaged with the valve member and an axial outer end which extends through said aperture in the body; means forming a seal between said aperture and said stem; end members extending into each end of the body bore, each end member having means which limits entry of the end member into the body to a predetermined amount, each end member having a passage with which the port in the valve member can be aligned to form the run of the valve and an axial inner end having a portion taperingly diverging axially inward from the passage, an annular groove in the taperingly diverging portion of the axial inner end, the inner circumferential wall of said groove spaced from the passage providing a wall between the passage and groove, an annular seat member positioned in each of said grooves, the depth of each of said seat members in its respective groove being sufficient so that sufficient friction is developed between the seat members and their grooves to retain the seat members within their grooves for a predetermined velocity of flow when the valve is in a position other than closed, each seat member having a portion extending beyond the surface of said taperingly diverging portion terminating in a tapered surface to oppose the spherical surface of the valve member, each end member extending into the body bore an amount sufficient to force the seat member into intimate sealing contact with the spherical surface of the valve member, the inward movement of the end members arrested by the means limiting entry so that the interference between the valve member and seats is a predetermined fixed amount; means disengageably connecting said end members to said body; means forming a seal between said body and said end members.

2. A rotatable spherical plug valve comprised of a valve body having a bore extending therethrough; a spherical valve member positioned in the bore, said spherical plug member having a port alignable with the bore in the open position of the valve; an aperture in the valve body; a stem having an inner end engaged with the valve member and an axial outer end which extends thorugh said aperture in the body; means forming a seal between said aperture and said stem; end members extending into each end of the body bore and detachably connected to the body, each end member having a passage with which the port in the valve member can be aligned to form the run of the valve and an axial inner end having a portion taperingly diverging axially inward from the passage, an annular groove in the taperingly diverging portion, the inner circumferential wall of said groove spaced from the passage providing a wall between the passage and groove; an annular seat member positioned in each of said grooves, the depth of said seat in the groove being sufficient so that sufficient friction is developed between the seat and the groove to retain the seat in the groove for a predetermined velocity of flow when the valve is in a position other than closed, each seat member having a portion extending beyond the surface of said taperingly diverging portion terminating in a tapered surface to oppose the spherical surface of the valve member, each end member extending into the body bore an amount sufficient to force the seat member into intimate sealing contact with the spherical surface of the valve member.

3. A rotatable spherical plug valve comprised of a valve body having a bore extending therethrough; a spherical valve member positioned in the bore, said spherical plug member having a port alignable with the bore in the open position of the valve; an aperture in the valve body; a stem having an inner end engaged with a valve member and an axial outer end which extends through said aperture in the body; means forming a seal between said aperture and said stem; end members extending into each end of the body bore and detachably connected to the body, each end member having a passage with which the port in the valve member can be aligned to form the run of the valve and an axial inner end having a portion taperingly diverging axially inward from the passage, an annular groove in the taperingly diverging portion, the inner circumferential wall of said groove spaced from the passage providing a wall between the passage and groove; an annular seat member positioned in each of said grooves; each seat member having a portion extending beyond the surface of said taperingly diverging portion terminating in a surface to oppose the spherical surface of the valve member, the depth of said seats in the grooves being sufficient so that sufficient friction is developed between the seat members and their grooves to retain the seat members within their grooves for a predetermined velocity of flow when the valve is in a position other than closed.

4. A spherical plug valve comprising a valve body having a valve chamber formed therein and having flow passages in communication with the valve chamber, a spherical plug member having a port formed therein positioned within the valve chamber and being movable from a closed position where the port is out of registry with the flow passages preventing the flow of fluid through the valve to a position where the port is aligned with the flow passages to allow the flow of fluid through the valve, means for imparting movement to the plug member, a pair of opposed annular tapering diverging portions of the valve body formed concentrically with the flow passages, an annular groove formed in each of the taperingly diverging portions, each of the annular grooves being defined by inner and outer cylindrical circumferential surfaces being concentric with the flow passages and an annular bottom surface substantially normal to the flow passage and the groove, an annular seat member posi- from the flow passage to define a wall between the flow passage and the groove, and annular seat member positioned in each of said grooves and being so dimensioned to completely fill the respective groove, each seat member having a portion thereof extending slightly beyond the surface of the taperingly divergent portion and being in sealing engagement with said plug, the spacing of the seats from the flow passage and the depth of the seats in the groove being sufficient so that sufficient friction is developed between the seats and their respective grooves to retain the seats within the grooves for a predetermined velocity of flow when the valve is in a position other than closed.

References Cited by the Examiner
UNITED STATES PATENTS

| | | | |
|---|---|---|---|
| 2,700,528 | 1/55 | Blackman | 251—317 XR |
| 2,762,601 | 9/56 | Clade | 251—172 |
| 2,868,498 | 1/59 | Kaiser | 251—172 |
| 2,885,179 | 5/59 | Hartmann | 251—317 |
| 2,912,219 | 11/59 | Clade | 251—315 |
| 2,995,336 | 8/61 | Usab | 251—315 |
| 3,006,602 | 10/61 | Usab | 251—315 |
| 3,076,631 | 2/63 | Grove | 251—317 XR |

ISADOR WEIL, *Primary Examiner.*

M. CARY NELSON, *Examiner.*

UNITED STATES PATENT AND TRADEMARK OFFICE
CERTIFICATE OF CORRECTION

PATENT NO. : 3,193,248

DATED : July 6, 1965

INVENTOR(S) : William E. Lowrey

It is certified that error appears in the above-identified patent and that said Letters Patent are hereby corrected as shown below:

Column 6, claim 4, cancel line 44 which reads "passage and the groove, an annular seat posi-" and substitute -- passages, said inner circumferential surface being spaced --;

line 46, cancel "and" (second occurrence) and substitute -- an --.

Signed and Sealed this

Eighth Day of September 1981

[SEAL]

Attest:

Attesting Officer

GERALD J. MOSSINGHOFF

Commissioner of Patents and Trademarks